US011459422B2

(12) United States Patent
Nickerl et al.

(10) Patent No.: US 11,459,422 B2
(45) Date of Patent: Oct. 4, 2022

(54) REACTIVE RESINS CONTAINING URETHANE METHACRYLATE COMPOUNDS, REACTIVE RESIN COMPONENTS AND REACTIVE RESIN SYSTEMS AND USE THEREOF

(71) Applicant: Hilti Aktiengesellschaft, Schaan (LI)

(72) Inventors: Georg Nickerl, Diessen am Ammersee (DE); Beate Gnass, Gersthofen (DE); Jens Bunzen, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 352 days.

(21) Appl. No.: 16/613,171

(22) PCT Filed: Jun. 21, 2018

(86) PCT No.: PCT/EP2018/066515
§ 371 (c)(1),
(2) Date: Nov. 13, 2019

(87) PCT Pub. No.: WO2019/007693
PCT Pub. Date: Jan. 10, 2019

(65) Prior Publication Data
US 2021/0079152 A1 Mar. 18, 2021

(30) Foreign Application Priority Data
Jul. 3, 2017 (EP) .................................... 17179293

(51) Int. Cl.
| | | |
|---|---|---|
| C08G 18/75 | (2006.01) | |
| C08G 18/73 | (2006.01) | |
| C08G 18/67 | (2006.01) | |
| C08L 75/16 | (2006.01) | |
| C08K 3/34 | (2006.01) | |
| C08G 18/24 | (2006.01) | |

(52) U.S. Cl.
CPC ......... *C08G 18/755* (2013.01); *C08G 18/246* (2013.01); *C08G 18/672* (2013.01); *C08G 18/73* (2013.01); *C08K 3/34* (2013.01); *C08L 75/16* (2013.01)

(58) Field of Classification Search
CPC .. C08G 18/755; C08G 18/672; C08G 18/246; C08G 18/73; C08L 15/16; C08K 3/34
See application file for complete search history.

(56) References Cited

U.S. PATENT DOCUMENTS

| 6,121,381 | A | 9/2000 | Deguchi et al. |
|---|---|---|---|
| 8,440,278 | B2 | 5/2013 | Pfeil |
| 8,735,475 | B2 | 5/2014 | Pfeil et al. |
| 9,580,633 | B2 | 2/2017 | Pfeil et al. |
| 9,879,111 | B2 | 1/2018 | Leitner |
| 2004/0092656 | A1 | 5/2004 | Vogel et al. |
| 2006/0051593 | A1* | 3/2006 | Peeler ................ C08G 18/7621 428/423.1 |
| 2006/0079660 | A1 | 4/2006 | Ludewig et al. |
| 2009/0162538 | A1 | 6/2009 | Boehm et al. |
| 2012/0315417 | A1 | 12/2012 | Pfeil |
| 2013/0123393 | A1 | 5/2013 | Pfeil et al. |
| 2014/0224424 | A1 | 8/2014 | Pfeil et al. |
| 2015/0080501 | A1 | 3/2015 | Khalyavina et al. |
| 2015/0232610 | A1 | 8/2015 | Leitner |
| 2015/0232719 | A1 | 8/2015 | Pfeil et al. |
| 2016/0039960 | A1 | 2/2016 | Pfeil et al. |
| 2017/0369373 | A1 | 12/2017 | Pfeil |

FOREIGN PATENT DOCUMENTS

| CA | 1305055 | 7/1992 |
|---|---|---|
| CN | 101629050 | 1/2010 |
| DE | 101 15 591 | 10/2002 |
| JP | H09-87527 | 3/1997 |
| JP | 2003-253076 | 9/2003 |
| JP | 2007-277308 | 10/2007 |
| JP | 2008-231232 | 10/2008 |
| JP | 2015-533905 | 11/2015 |
| JP | 2015536367 | 12/2015 |
| RU | 2173133 | 9/2001 |
| RU | 2374290 | 11/2009 |
| RU | 2459848 | 8/2012 |
| RU | 2012123716 | 12/2013 |
| RU | 2596877 | 9/2016 |
| RU | 2597701 | 9/2016 |
| WO | 2009/085898 | 7/2009 |

OTHER PUBLICATIONS

Encyclopedia of Polymers, Ed. by V.A. Kabanov, vol. 3, "Sovetskaya Entsyklopediya", Publishing House, 1977.
Russian Office Action dated Oct. 22, 2021 in Russian Application 2020104354, with English translation, 24 pages.
Russian Search Report dated Oct. 22, 2021 in Russian Application 2020104354, with English translation, 6 pages.
Ya. A. Ugai, General and Inorganic Chemistry, Textbook for college students studying in the field of "Chemistry", "Vysshaya Shkola", Publishing House, Moscow, 1997, 527p.
International Search Report dated Sep. 12, 2018 in PCT/EP2018/066515 with English translation.
Written Opinion dated Sep. 12, 2018 in PCT/EP2018/066515.

* cited by examiner

*Primary Examiner* — Robert D Harlan
(74) *Attorney, Agent, or Firm* — Grüneberg and Myers PLLC

(57) ABSTRACT

Low viscosity urethane methacrylate compounds are used in a reactive resin and in a reactive resin component for construction purposes. The compounds are useful for lowering the viscosity of a reactive resin and for lowering the forces of extrusion of a reactive resin component or of a reactive resin system.

20 Claims, No Drawings

REACTIVE RESINS CONTAINING URETHANE METHACRYLATE COMPOUNDS, REACTIVE RESIN COMPONENTS AND REACTIVE RESIN SYSTEMS AND USE THEREOF

This application is a National Stage entry under § 371 of International Application No. PCT/EP2018/066515, filed on Jun. 21, 2018, and which claims the benefit of European Application No. 17179293.0, filed on Jul. 3, 2017.

BACKGROUND OF THE INVENTION

Field of the Invention

The invention relates to the use of low-viscosity urethane methacrylate compounds as backbone resins in reactive resins, especially for lowering the viscosity of reactive resins containing such compounds and thus of the forces for extruding reactive-resin components produced therefrom. Furthermore, the invention relates to the use of these reactive resins and of their reactive-resin components for construction purposes, especially for chemical fastening.

Discussion of the Background

The free-radical-curing fastening caulks currently in use are based on unsaturated polyesters, vinyl ester urethane resins and epoxy acrylates. These are mostly two-component reactive-resin systems, wherein one component is the resin (known as component (A)) and the other component (component (B)) contains the curing agent. Further ingredients such as inorganic fillers and additives, accelerators, stabilizers and reactive diluents may be contained in the one and/or the other component. By mixing the two components, the curing of the mixed components is initiated. During use of the fastening caulks for fastening of anchoring elements in drilled holes, the curing takes place in the drilled holes.

Such a fastening caulk is known, for example, from DE 3940138 A1. This describes fastening caulks on the basis of monomers that carry cycloaliphatic groups and may additionally contain unsaturated polyester or vinyl ester resins. Such mortar caulks have relatively high viscosities, however, whereby their use is limited, especially for the chemical fastening technique.

Relatively broad temperature ranges, from −25° C. to +45° C., for example, can occur on construction sites, depending on time of year and/or geographic location. Therefore not only the high viscosity of the curable fastening caulks described in the introduction but also their resulting thixotropic behavior during application can lead to problems. Therefore the area of use of such fastening caulks is subject to great demands, especially for use in various temperature ranges.

On the one hand, a sufficiently low viscosity of the caulk that it can be extruded should be ensured in the low-temperature range, so that the flow resistance of the caulk is not too high. Thus it should be ensured that the caulks can be injected, for example into the drilled hole, using a hand dispenser, for example. In particular, during the use of static mixers, a low viscosity is of importance for flawless mixing of the two components.

On the other hand, the caulk should be sufficiently stable in the higher temperature range, so that continued running of the individual components after release of pressure on the dispenser is prevented and that the caulk does not leak out of the drilled hole during overhead installation.

A further problem caused by temperature fluctuations is that the free-radical chain polymerization does not take place uniformly. Thus the cured fastening caulk has fluctuating/irregular and frequently inadequate homogeneity, which is manifested in fluctuations of the load ratings and frequently also in generally low load ratings. For example, at temperatures below 20° C., premature setting of the fastening caulk may occur due to an increase of the viscosity. Thereby the conversion in the free-radical chain polymerization is substantially smaller, thus contributing to a reduction of the load ratings.

Since temperature fluctuations on the construction site cannot be avoided, a need continues to exist for two-component reactive-resin systems that ensure homogeneity both at high and at low temperatures as well as reproducibility of the load ratings associated therewith.

In order to address the foregoing problems, the proportion of reactive diluents in the fastening caulks available on the market is increased, ultimately leading to reduction of the resin proportion in the caulk. Not uncommonly, the proportion of reactive diluents amounts to at least 50% relative to the reactive resin.

However, the increase of the proportion of reactive diluents also leads to some disadvantages, which become evident above all during application of the fastening caulk for fastening of anchoring means in drilled holes.

A considerable disadvantage is that the reduction of the proportion of highly viscous resin, which is essential for the performance capability of the caulk, negatively influences the performance capability of the cured fastening caulk.

A further disadvantage is greater shrinkage of the fastening caulk after curing, which may additionally influence the performance capability of the cured fastening caulk negatively. This is attributed to the fact that the contact between the cured fastening caulk and the undercuts, formed in the wall of the drilled hole during creation of the drilled hole, which become apparent in particular during use of percussion drills, is significantly reduced. This usually also prevents application of fastening caulks based on free-radical-curing compounds in diamond-drilled holes.

A further disadvantage is that, depending on type of reactive diluent, the proportion of volatile organic compounds (VOC) in the caulks may increase. This may lead to evaporation from the fastening caulk and/or the canister and possibly to a drop in performance of the cured fastening caulk that results from this. In addition, some of these compounds may also be hazardous to health and/or are therefore subject to mandatory labeling.

In addition, the number of usable reactive diluents is small, since only few available reactive diluents are on the market at present. Other than the free-radical-curing functional groups, the available reactive diluents have no or only a very limited choice of other functional groups and therefore often have only little influence on the property of the cured fastening caulk. This leads to the situation that the fastening caulks are being developed mostly for specific applications, such as certain temperature ranges, for example, or for application in specific substrates. This calls for an immense development effort in order to be able to address new and broader applications with the fastening caulks.

Heretofore special products have been produced, the formulations of which are adapted to the special application temperatures. Products indeed exist that are intended for a broad temperature range while still having the same properties over the entire range. Precisely in the boundary ranges, i.e. at low and at high temperatures, impairments must be expected either in processability, in curing of the caulk or in the properties of the cured caulk. No fastening caulk is known that covers a very broad temperature range without having to tolerate losses in the boundary ranges.

A need therefore exists for fastening caulks having properties capable of being influenced not by the use of reactive diluents but instead by the resin ingredient.

SUMMARY OF THE INVENTION

One object of the present invention is to influence the properties of a reactive-resin master batch as well as of a reactive resin produced therefrom in a manner attributable solely to the structure of the backbone resin but not to the presence of additional compounds, such as reactive diluents or additives, for example. Mainly, the object of the present invention is to control the properties of a two-component or multi-component reactive-resin system by means of the backbone resin it contains. In particular, it is an object of the present invention to provide fastening caulks, such as two-component or multi-component reactive-resin systems, for example, the viscosity of which depends less on the temperature of application of the fastening caulk, which have a low viscosity, especially at low temperatures, such as below 20° C., for example, and thus make it possible to supply reactive-resin systems, which have smaller extrusion forces at application temperatures below 20° C., especially at application temperatures below 10° C., and thus are more user-friendly than the conventional fastening systems.

A further object of the invention is to provide a fastening caulk that has lower forces to extrude the reactive-resin component than do conventional caulks.

Yet another object of the present invention is to provide a fastening caulk that avoids constituents posing a serious health hazard in the reactive-resin component and that optionally is also exempt from labeling. In particular, it is an object to reduce the proportion of reactive diluents in reactive resins for chemical fastening, without having to sacrifice their function or functions and positive effects on the cured fastening caulk.

Yet another object of the present invention is to provide a fastening caulk that is distinguished by good processability, curing behavior and small shrinkage over a broad temperature range.

These objects are solved by the use, by the reactive resin, and by the reactive-resin components according to various embodiments described below.

DETAILED DESCRIPTION OF THE INVENTION

Surprisingly, it has been found that, due to the use of certain low-viscosity urethane methacrylate compounds as backbone resin, a broad temperature range is achieved in which the viscosity of a reactive resin containing these compounds and of a reactive-resin component obtainable therefrom remains largely uninfluenced by the temperatures.

Furthermore, it has been found that it is possible, due to the use of certain low-viscosity urethane methacrylate compounds, to reduce the proportion of reactive diluents in reactive resins for chemical fastening, without having to sacrifice their function or functions and positive effects on the cured fastening caulk.

Advantageously, the present invention permits, in comparison with the conventional systems, low extrusion forces at low application temperatures in a reactive-resin system. Due to the use of low-viscosity urethane methacrylate compounds as backbone resin in reactive resins, it has therefore become possible to reduce the forces for extruding a reactive-resin system not only at 20° C. but also at lower temperatures, for example at temperatures below 10° C., preferably below 5° C., without requiring a high proportion of reactive diluent for the purpose.

For better understanding of the invention, the following explanations of the reactive-resin production method and of the terminology used herein are considered to be useful.

The reactive-resin production method, explained here by means of the example of a urethane methacrylate based on hexamethylene diisocyanate, typically takes place as follows:

1. Production of Backbone-Resin/Reactive-Resin Master Batch

Hexamethylene3diisocyanate (HDI) and hydroxypropyl methacrylate (HPMA) are reacted in the presence of a catalyst and of an inhibitor (used to stabilize the backbone resin formed by the polymerization, and frequently also called stabilizer or process stabilizer). In this process, the backbone resin is obtained.

The reaction mixture obtained after the end of the reaction is known as reactive-resin master batch. This is not worked up further, i.e. the backbone resin is not isolated.

2. Production of Reactive Resin

After completion of the reaction to the backbone resin, an accelerator-inhibitor system, i.e. a combination of one or more additional inhibitors and one or more accelerators and optionally a reactive diluent, is added to the reactive-resin master batch.

Hereby the reactive resin is obtained.

The accelerator-inhibitor system is used to adjust the reactivity of the reactive resin, i.e. to adjust the point in time up to which the reactive resin has not yet cured completely after addition of an initiator and up to which point in time a plugging caulk mixed in with the reactive resin therefore remains processable after mixing with the initiator.

The inhibitor in the accelerator-inhibitor system may be identical to the inhibitor for the production of the backbone resin, provided this is also suitable for adjusting the reactivity, or it may be a different inhibitor if it does not possess both functions. As an example, 4-hydroxy-2,2,6,6-tetramethyl-piperidinyl-1-oxyl (TEMPOL) may be used as stabilizer and as inhibitor for adjustment of the reactivity.

3. Production of Reactive-Resin Component

In order to use the reactive resin for construction purposes, especially for chemical fastening, one or more inorganic aggregates, such as additives and/or fillers, are added after production of the reactive resin.

Hereby the reactive-resin component is obtained.

Within the meaning of the invention, the terms used:
"backbone resin" means a usually solid or highly viscous free-radical-curing polymerizable resin, which cures by polymerization (e.g. after addition of an initiator in the presence of an accelerator) and as a rule exists without reactive diluent and without further purification and thus may contain impurities;
"reactive master batch" means the reaction product of the reaction for production of the backbone resin, i.e. a mixture of backbone resin, reactive diluent and optionally further ingredients of the reaction mixture;
"reactive resin" means a mixture of reactive-resin master batch, at least one accelerator and at least one inhibitor (also referred to as accelerator-inhibitor system), at least one reactive diluent and optionally further additives; the reactive resin is typically liquid or viscous and may be further processed to a reactive-resin component; herein, the reactive resin is also referred to as "resin mixture";

"inhibitor" means a substance that suppresses an undesired free-radical polymerization during the synthesis or storage of a resin or of a resin-containing composition (these substances are also referred to in professional circles as "stabilizer") or that causes a time delay of free-radical polymerization of a resin after addition of an initiator (usually in conjunction with an accelerator) (these substances are also referred to in professional circles as "inhibitor"—the respective meaning of the term is apparent from the context);

"accelerator" means a reagent that participates with the initiator in a reaction, so that larger quantities of free radicals are already generated by the initiator at lower temperatures, or that catalyzes the decomposition reaction of the initiator;

"reactive diluent" means liquid or low-viscosity monomers and backbone resins, which dilute other backbone resins or the reactive-resin master batch and thereby impart the necessary viscosity for application thereof, which contain functional groups capable of reaction with the backbone resin and during polymerization (curing) become largely an ingredient of the cured caulk (e.g. of the mortar); reactive diluents are also called co-polymerizable monomers;

"reactive-resin component" means a liquid or viscous mixture of reactive resin and fillers as well as optionally further components, e.g. additives; typically, the reactive-resin component is one of the two components of a two-component reactive-resin system for chemical fastening;

"initiator" means a substance that forms reaction-initiating free radicals (usually in combination with an accelerator);

"hardener component" means a composition that contains an initiator for polymerization of a backbone resin; the hardener component may be solid or liquid and besides the initiator may contain a solvent as well as fillers and/or additives; typically, the hardener component in addition to the reactive-resin component is the other of the two components of a two-component reactive-resin system for chemical fastening;

"mortar caulk/fastening caulk" means the composition that is obtained by mixing the reactive-resin component with the hardener component and that may be used directly as such for chemical fastening;

"reactive-resin system" generally means a system that comprises components stored separately from one another, so that curing of the backbone resin contained in one component takes place only after mixing of the components;

"two-component system" or "two-component reactive-resin system" means a reactive-resin system that comprises two components stored separately from one another, a reactive-resin component (A) and a hardener component (B), so that curing of the backbone resin contained in the reactive-resin component takes place only after mixing of the two components;

"multi-component system" or "multi-component reactive-resin system" means a reactive-resin system that comprises several components stored separately from one another, including a reactive-resin component (A) and a hardener component (B), so that curing of the backbone resin contained in the reactive-resin component takes place only after mixing of all components;

"construction purposes" means any application for creation and maintenance or repair of building parts and building structures, as a polymer concrete, as a plastic-based coating caulk or as a cold-curing road marking; in particular, the reinforcement of building parts and building structures, for example walls, ceilings or floors, the fastening of building parts, such as panels or blocks, for example of stone, glass or plastic, on building parts or building structures, for example by adhesive bonding (constructional adhesive bonding) and quite particularly chemical fastening of anchoring means, such as anchor rods, bolts or the like in recesses, such as drilled holes;

"chemical fastening" means fastening (by substance-to-substance and/or interlocking joining) of anchoring means, such as anchor rods, bolts, rebars, screws or the like in recesses, such as drilled holes, especially in holes drilled in various substrates, especially mineral substrates, such as those on the basis of concrete, cellular concrete, brickwork, lime sandstone, sandstone, natural rock, glass and the like, and metallic substrates, such as those of steel;

"aliphatic hydrocarbon group" means acyclic and cyclic saturated or unsaturated hydrocarbon groups that are not aromatic (PAC, 1995, 67, 1307; Glossary of class names of organic compounds and reactivity intermediates based on structure (IUPAC Recommendations 1995));

"(meth)acryl . . . / . . . (meth)acryl . . . " means that both the "methacryl . . . / . . . methacryl . . . " and the "acryl . . . / . . . acryl . . . " compounds are intended; preferably, "methacryl . . . / . . . methacryl . . . " compounds are intended in the present invention;

"a", "an", "any", as the indefinite article preceding a class of chemical compounds, e.g. preceding the word "urethane methacrylate", means that at least one, i.e. one or more compounds included under this class of chemical compounds, e.g. various urethane methacrylates, may be intended. In a preferred embodiment, only one individual compound is intended with this indefinite article;

"at least one" means numerically "one or more". In a preferred embodiment, "a", "an", "any" is meant numerically with this term;

"contain" and "comprise" mean that still further ingredients may be present in addition to those mentioned. These terms are intended to be inclusive and therefore also encompass "consist of". "Consist of" is intended conclusively and means that no further ingredients may be present. In a preferred embodiment, the terms "contain" and "comprise" mean the term "consist of";

"approximately" or "circa" preceding a numerical value mean a range of ±5% of this value, preferably ±2% of this value, more preferably ±1% of this value, particularly preferably ±0% of this value (i.e. exactly this value);

a range limited by numbers means that the two extreme values and any value within this range are disclosed individually.

All standards cited in this text (e.g. DIN standards) were used in the version that was current on the date of filing of this application.

A first subject matter of the invention is the use of a compound of general formula (I)

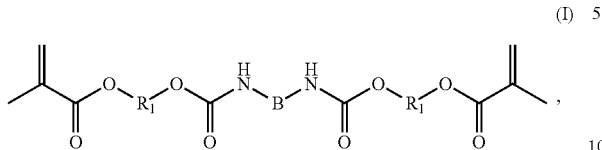

in which
B is a divalent linear, branched or cyclic aliphatic hydrocarbon group, and each $R_1$, independently of one another, is a divalent branched or linear aliphatic $C_1$-$C_{15}$ alkylene group,
in a reactive-resin or a reactive-resin component for chemical fastening.

A second subject matter is the use of a compound of general formula (I)

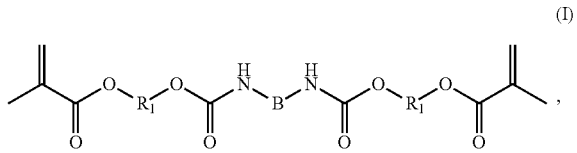

in which
B is a divalent linear, branched or cyclic aliphatic hydrocarbon group, and each $R_1$, independently of one another, is a divalent branched or linear aliphatic $C_1$-$C_1$ alkylene group,
for lowering the viscosity of a reactive resin or for lowering the forces for extrusion of a reactive-resin component for chemical fastening.

A third subject matter is a reactive resin that contains the compounds of general formula (I). A fourth subject matter is a reactive-resin component that contains the reactive resin. A fifth subject matter is a reactive-resin system, having the reactive-resin component (A) and a hardener component (B), which contains an initiator (such as a peroxide, for example) for curing the backbone resin contained in the reactive resin. Components (A) and (B) are packaged in a manner spatially separated from one another until use of the reactive-resin system, so that a reaction takes place only when the two components are brought into contact with one another. A sixth, seventh and eighth subject matter is the use respectively of the reactive resin, of the reactive-resin component and of the reactive-resin system for construction purposes, especially for chemical fastening.

According to the invention, the low-viscosity urethane methacrylate compound is a compound of general formula (I)

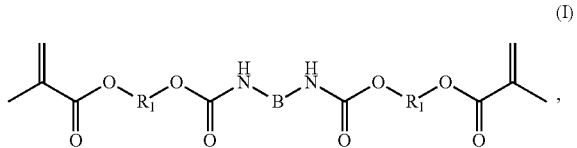

in which
B is a divalent linear, branched or cyclic aliphatic hydrocarbon group, and each $R_1$, independently of one another, is a divalent branched or linear aliphatic $C_1$-$C_{15}$ alkylene group.

In one embodiment, the divalent linear, branched or cyclic aliphatic hydrocarbon group B in formula (I) is a divalent linear aliphatic hydrocarbon group, which preferably is selected from the group consisting of pentylene, hexylene, heptylene or octylene groups. Particularly preferably, the linear aliphatic hydrocarbon group B in this embodiment is a hexylene group.

In an alternative embodiment, the divalent linear, branched or cyclic aliphatic hydrocarbon group B in the compound of formula (I) is a divalent cyclic aliphatic hydrocarbon group, which preferably is selected from the group consisting of 3-methylene-3,5,5-tetramethylcyclohexylene, methylenedicyclohexylene and 1,3-dimethylenecyclohexyl groups. Particularly preferably, the cyclic aliphatic hydrocarbon group B in this embodiment is a 3-methylene-3,5,5-trimethylcyclohexylene or 1,3-dimethylenecyclohexyl group.

The aliphatic hydrocarbon group is derived from aliphatic diisocyanates, which includes linear and branched diisocyanates and cycloaliphatic diisocyanates.

Suitable aliphatic hydrocarbon groups are divalent groups, such as are obtained by removal of the isocyanate groups from an aliphatic diisocyanate.

Particularly preferably, B is derived from aliphatic diisocyanates, such as, for example, 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethyl-cyclohexane (isophorone diisocyanate; IPDI), 1-isocyanato-1-methyl-4(3)-isocyanatomethylcyclohexane, 2,4'- and 4,4'-diisocyanatodicyclohexylmethane ($H_{12}$MDI), 1,3- and 1,4-bis(isocyanatomethyl)cyclohexane, bis-(isocyanatomethyl)-norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetra-methyl-1,1'-bi(cyclohexyl), 1,8-diisocyanato-p-menthane, 1,3-diisocyanato-adamantane, 1,3-dimethyl-5,7-diisocyanatoadamantane.

$R_1$, respectively independently of one another, is a branched or linear aliphatic $C_1$-$C_{15}$ alkylene group, which may be substituted. $R_1$ is derived from hydroxyalkyl methacrylates and comprises divalent alkylene groups, such as are obtained by removal of the hydroxyl groups and of the methacrylate group.

In one embodiment, the alkylene group $R_1$ is divalent.

In an alternative embodiment, however, it may also be trivalent or polyvalent, so that the compound of formula (I) may also have more than two methacrylate groups, even if this is not directly apparent from formula (I).

Preferably, the alkylene group $R_1$ is a divalent linear or branched $C_1$-$C_{15}$ alkylene group, preferably a $C_1$-$C_6$ alkylene group and particularly preferably a $C_1$-$C_4$ alkylene group. These include in particular the methylene, ethylene, propylene, i-propylene, n-butylene, 2-butylene, sec.-butylene, tert.-butylene, n-pentylene, 2-pentylene, 2-methylbutylene, 3-methylbutylene, 1,2-dimethylpropylene, 1,1-dimethylpropylene, 2,2-dimethylpropylene, 1-ethylpropylene, n-hexylene, 2-hexylene, 2-methylpentylene, 3-methylpentylene, 4-methylpentylene, 1,2-dimethylbutylene, 1,3-dimethylbutylene, 2,3-dimethylbutylene, 1,1-dimethylbutylene, 2,2-dimethylbutylene, 3,3-dimethylbutylene, 1,1,2-trimethylpropylene, 1,2,2-trimethylpropylene, 1-ethylbutylene, 2-ethylbutylene, 1-ethyl-2-methylpropylene, n-heptylene, 2-heptylene, 3-heptylene, 2-ethylpentylene, 1-propylbutylene groups or the octylene group, among which the ethylene, propylene and i-propylene groups are more preferred. In a particularly preferred embodiment of the present invention, the two $R_1$ groups are identical and are an ethylene, propylene or i-propylene group.

The low-viscosity urethane methacrylate compounds are obtained by reaction of two equivalents of hydroxyalkyl methacrylate with one equivalent of diisocyanate. Diisocyanate and hydroxyalkyl methacrylate are made to react in the presence of a catalyst and of an inhibitor, which acts to stabilize the resulting compound.

Suitable hydroxyalkyl methacrylates are such with alkylene groups having up to 15 carbon atoms, wherein the alkylene groups may be linear or branched. Hydroxyalkyl methacrylates having 1 to 10 carbon atoms are preferred. More preferred hydroxyalkyl methacrylates are such with two to six carbon atoms, among which 2-hydroxyethyl methacrylate, 2-hydroxypropyl methacrylate (2-HPMA), 3-hydroxypropyl methacrylate (3-HPMA) and glycerol 1,3-dimethacrylate are particularly preferred. 2-hydroxypropyl methacrylate (2-HPMA) or 3-hydroxypropyl methacrylate (3-HPMA) are quite particularly preferred.

Suitable diisocyanates are such with aliphatically and/or cycloaliphatically bound isocyanate groups, such as, for example, 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethyl-cyclohexane (isophorone diisocyanate; IPDI), 1-isocyanato-1-methyl-4(3)-isocyanatomethylcyclohexane, 2,4'- and 4,4'-diisocyanatodicyclohexylmethane ($H_{12}$MDI), 1,3- and 1,4-bis(isocyanatomethyl)cyclohexane, bis-(isocyanatomethyl)-norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetra-methyl-1,1'-bi(cyclohexyl), 1,8-diisocyanato-p-menthane, 1,3-diisocyanato-adamantane, 1,3-dimethyl-5,7-diisocyanatoadamantane.

Preferred diisocyanates according to the present invention are hexamethylene diisocyanate, isophorone diisocyanate and 1,3-bis(isocyanatomethyl)cyclohexane.

Preferably, the compound of formula (I) is a compound of general formula (IIa) to (IIc):

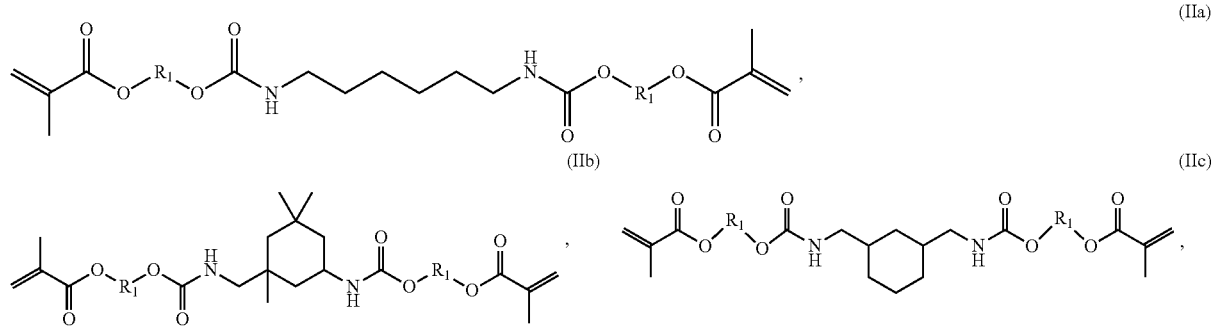

in which each $R_1$, independently of one another, is as defined hereinabove.

Quite particularly preferably, the compound of formula (I) is a compound of formula (III) to (V):

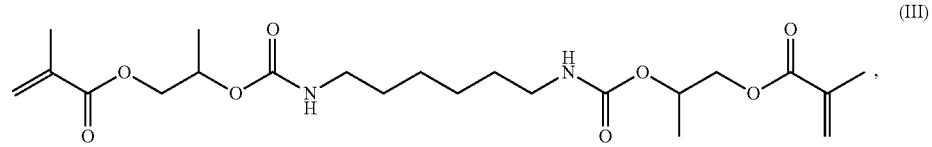

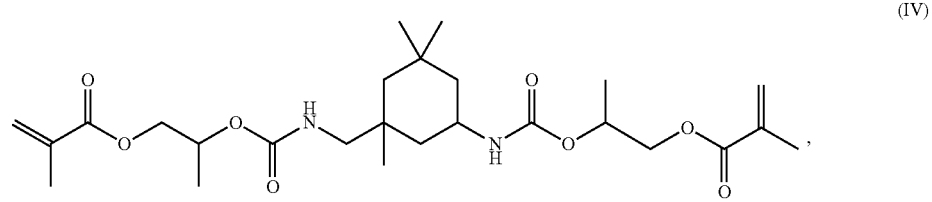

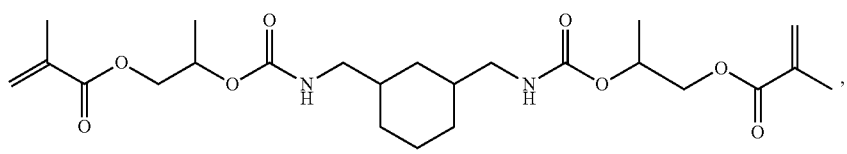

(V)

The compounds of formulas (IV) and (V) may exist in different compositions both as pure compounds and as optical isomers or as isomer mixtures, which optionally may be separated in conventional manner. Both the pure isomers and the isomer mixtures as well as the use thereof are subject matter of the present invention. Mixtures containing different proportions of isomeric compounds are also subject matter of the invention.

For the case that not all isocyanate groups are converted during production of the inventive compounds, or that some of the isocyanate groups are converted to other groups prior to the reaction, for example by a side reaction, compounds are obtained that may be contained either as main compounds or as impurities in the reactive-resin master batch. To the extent that these compounds may be used for the inventive purposes, they are also comprised by the invention.

The compounds of formula (I) are used according to the invention for production of a reactive resin. Hereby the viscosity of the reactive resin produced in this way may be lowered, without the need for a high proportion of reactive diluents, as is the case for commercial caulks, and without the problems associated with a high proportion of reactive diluents.

The inventive reactive resin contains at least one compound of formula (I) as described hereinabove as a backbone resin, an inhibitor, an accelerator and optionally a reactive diluent.

Since the backbone resin, after its production, is typically used without isolation for production of the reactive resin, further ingredients, such as a catalyst, for example, contained in the reactive-resin master batch, are usually still also present in the reactive resin, besides the backbone resin.

The proportion of the compound of general formula (I) in the inventive reactive resin ranges from 25 wt % to 65 wt %, preferably from 30 wt % to 45 wt %, particularly preferably from 33 wt % to 40 wt % relative to the total weight of the reactive resin.

The stable free radicals that are commonly used for free-radical-curing polymerizable compounds, such as N-oxyl free radicals, as are known to the person skilled in the art, are suitable as inhibitors.

The inhibitor may function on the one hand to suppress undesired free-radical polymerization during synthesis of the backbone resin or during storage of the reactive resin and of the reactive-resin component. It may also function—optionally additionally—to cause a time delay of the free-radical polymerization of the backbone resin after addition of the initiator, and thereby to adjust the processing time of the reactive resin or of the reactive-resin component after mixing with the curing agent.

As examples of stable N-oxyl radicals, such may be used as described in DE 199 56 509 A1 and DE 195 31 649 A1. Such stable nitroxyl free radicals are of the piperidinyl-N-oxyl or tetrahydropyrrole-N-oxyl type or a mixture thereof.

Preferred stable nitroxyl free radicals are selected from the group consisting of 1-oxyl-2,2,6,6-tetramethylpiperidine, 1-oxyl-2,2,6,6-tetramethylpiperidine-4-ol (also known as TEMPOL), 1-oxyl-2,2,6,6-tetramethylpiperidine-4-one (also known as TEMPON), 1-oxyl-2,2,6,6-tetramethyl-4-carboxyl-piperidine (also known as 4-carboxy-TEMPO), 1-oxyl-2,2,5,5-tetramethylpyrrolidine, 1-oxyl-2,2,5,5-tetramethyl-3-carboxylpyrrolidine (also known as 3-carboxy-PROXYL) and mixtures of two or more of these compounds, wherein 1-oxyl-2,2,6,6-tetramethylpiperidine-4-ol (TEMPOL) is particularly preferred. The TEMPOL is preferably the TEMPOL used in the examples.

Besides the nitroxyl free radical of the piperidinyl-N-oxyl or tetrahydropyrrole-N-oxyl type, one or more further inhibitors may be present not only for further stabilization of the reactive resin or of the reactive-resin component (A) containing the reactive resin or of other compositions containing the reactive resin but also for adjustment of the resin reactivity.

The inhibitors that are commonly used for free-radical-curing polymerizable compounds, as are known to the person skilled in the art, are suitable for this purpose. Preferably, these further inhibitors are selected from among phenolic compounds and non-phenolic compounds and/or phenothiazines.

Phenols, such as 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidenediphenol, 6,6'-di-tert-butyl-4,4'-bis(2,6-di-tert-butylphenol), 1,3,5-trimethyl-2,4,6-tris(3,5-di-tert-butyl-4-hydroxybenzyl)benzene, 2,2'-methylene-di-p-cresol, catechols, such as pyrocatechol, and catechol derivatives, such as butyl pyrocatechols, such as 4-tert-butyl pyrocatechol and 4,6-di-tert-butyl pyrocatechol, hydroquinones, such as hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methylbenzoquinone, 2,6-dimethylbenzoquinone, naphthoquinone, or mixtures of two or more thereof, are suitable as phenolic inhibitors. These inhibitors are often ingredients of commercial free-radical curing reactive-resin components.

Phenothiazines, such as phenothiazine and/or derivatives or combinations thereof, or stable organic free radicals, such as galvinoxyl and N-oxyl free radicals, for example, but not of piperidinyl-N-oxyl or tetrahydropyrrole-N-oxyl type, such as aluminum-N-nitrosophenylhydroxylamine, diethylhydroxylamine, oximes, such as acetaldoxime, acetone oxime, methyl ethyl ketoxime, salicyloxime, benzoxime, glyoximes, dimethylglyoxime, acetone-O-(benzyloxycarbonyl)oxime and the like, may be preferably regarded as non-phenolic inhibitors.

Furthermore, pyrimidinol or pyridinol compounds substituted in para position relative to the hydroxyl group may be used as inhibitors, as described in Patent Specification DE 10 2011 077 248 B1.

Preferably, the further inhibitors are selected from the group of catechols, catechol derivatives, phenothiazines, tert-butylcatechol, Tempol or a mixture of two or more thereof. Particularly preferably, the further inhibitors are selected from the group comprising catechols and phenothiazines. The further inhibitors used in the examples are quite particularly preferred, preferably approximately in the quantities specified in the examples.

Depending on the desired properties of the reactive resin, the further inhibitors may be used either alone or as a combination of two or more thereof.

The inhibitor or the inhibitor mixture is added in the proportions common in the art, preferably in a proportion of approximately 0.0005 to approximately 2 wt % (relative to the reactive resin ultimately produced therewith), more preferably of approximately 0.01 to approximately 1 wt % (relative to the reactive resin), even more preferably from approximately 0.05 to approximately 1 wt % (relative to the reactive resin), even much more preferably from approximately 0.2 to approximately 0.5 wt % (relative to the reactive resin).

The compounds of general formula (I), especially for use in reactive resins and reactive-resin components for chemical fastening and structural adhesive bonding, are generally cured by peroxides as curing agents. The peroxides are preferably initiated by an accelerator, so that polymerization takes place even at low application temperatures. The accelerator is already added to the reactive resin.

Suitable accelerators known to the person skilled in the art are, for example, amines, preferably tertiary amines and/or metal salts.

Suitable amines are selected from among the following compounds: dimethylamine, trimethylamine, ethylamine, diethylamine, triethylamine, n-propylamine, di-n-propylamine, tri-n-propylamine, isopropylamine, diisopropylamine, triisopropylamine, n-butylamine, isobutylamine, tert-butylamine, di-n-butylamine, diisobutylamine, tri-isobutylamine, pentylamine, isopentylamine, diisopentylamine, hexylamine, octylamine, dodecylamine, laurylamine, stearylamine, aminoethanol, diethanolamine, triethanolamine, aminohexanol, ethoxyaminoethane, dimethyl-(2-chloroethyl)amine, 2-ethylhexylamine, bis-(2-chloroethyl)amine, 2-ethylhexylamine, bis-(2-ethylhexyl)amine, N-methylstearylamine, dialkylamines, ethylenediamines, N,N'-dimethylethylenediamine, tetramethylethylenediamine, diethylenetriamine, permethyldiethylenetriamine, triethylenetetramine, tetraethylenepentamine, 1,2-diaminopropane, di-propylenetriamine, tripropylenetetramine, 1,4-diaminobutane, 1,6-diaminohexane, 4-amino-1-diethylaminopentane, 2,5-diamino-2,5-dimethylhexane, trimethylhexamethylenediamine, N,N-dimethylaminoethanol, 2-(2-diethylaminoethoxy)ethanol, bis-(2-hydroxyethyl)-oleylamine, tris[2-(2-hydroxy-ethoxy)-ethyl]amine, 3-amino-1-propanol, methyl-(3-aminopropyl) ether, ethyl-(3-aminopropyl) ether, 1,4-butanediol-bis(3-aminopropyl) ether, 3 dimethylamino-1-propanol, 1-amino-2-propanol, 1-diethylamino-2-propanol, diisopropanolamine, methyl-bis-(2-hydroxypropyl)amine, tris-(2-hydroxypropyl)amine, 4-amino-2-butanol, 2-amino-2-methylpropanol, 2-amino-2-methyl-propanediol, 2-amino-2-hydroxymethylpropanediol, 5-diethylamino-2-pentanone, 3 methylamino-propionic acid nitrile, 6-aminohexanoic acid, 11-aminoundecanoic acid, 6-aminohexanoic acid ethyl ester, 11-aminohexanoic acid isopropyl ester, cyclohexylamine, N-methylcyclohexylamine, N,N-dimethylcyclohexylamine, dicyclohexylamine, N-ethylcyclohexylamine, N-(2-hydroxyethyl)-cyclohexylamine, N,N-bis-(2-hydroxyethyl)-cyclohexylamine, N-(3-aminopropyl)-cyclohexylamine, aminomethylcyclohexane, hexahydrotoluidine, hexahydrobenzylamine, aniline, N-methylaniline, N,N-dimethylaniline, N,N-diethylaniline, N,N-dipropylaniline, isobutylaniline, toluidine, diphenylamine, hydroxyethylaniline, bis-(hydroxyethyl)aniline, chloroaniline, aminophenols, aminobenzoic acids and their esters, benzylamine, dibenzylamine, tribenzylamine, methyldibenzylamine, α-phenylethylamine, xylidine, diisopropylaniline, dodecylaniline, aminonaphthalene, N-methylaminonaphthalene, N,N-dimethylaminonaphthalene, N,N-dibenzylnaphthalene, diaminocyclohexane, 4,4'-diaminodicyclohexylmethane, diamino-dimethyl-dicyclohexylmethane, phenylenediamine, xylylenediamine, diaminobiphenyl, naphthalenediamines, toluidines, benzidines, 2,2-bis-(aminophenyl)-propane, aminoanisoles, amino-thiophenols, aminodiphenyl ether, aminocresols, morpholine, N-methylmorpholine, N-phenylmorpholine, hydroxyethylmorpholine, N-methylpyrrolidine, pyrrolidine, piperidine, hydroxyethylpiperidine, pyrroles, pyridines, quinolines, indoles, indolenines, carbazoles, pyrazoles, imidazoles, thiazoles, pyrimidines, quinoxalines, aminomorpholine, dimorpholinethane, [2,2,2]-diazabicyclooctane and N,N-dimethyl-p-toluidine.

According to the invention, di-iso-propanol-p-toluidine or N,N-bis(2-hydroxyethyl)-m-toluidine is used as accelerator.

Preferred amines are aniline derivatives and N,N-bisalkylarylamines, such as N,N-dimethylaniline, N,N-diethylaniline, N,N-dimethyl-p-toluidine, N,N-bis(hydroxyalkyl) arylamines, N,N-bis(2-hydroxyethyl)anilines, N,N-bis(2-hydroxyethyl)toluidine, N,N-bis(2-hydroxypropyl)aniline, N,N-bis(2-hydroxypropyl)toluidine, N,N-bis(3-methacryloyl-2-hydroxypropyl)-p-toluidine, N,N-dibutoxyhydroxypropyl-p-toluidine and 4,4'-bis(dimethylamino)diphenylmethane. Di-iso-propanol-p-toluidine is particularly preferred.

Polymeric amines, such as those obtained by polycondensation of N,N-bis(hydroxyalkyl)aniline with dicarboxylic acids or by polyaddition of ethylene oxide or other epoxides and these amines, are likewise suitable as accelerators.

Suitable metal salts are, for example, cobalt octoate or cobalt naphthenoate as well as vanadium, potassium, calcium, copper, manganese or zirconium carboxylates. Further suitable metal salts are the tin catalysts described hereinabove.

If an accelerator is used, it is introduced in a proportion of 0.01 to 10 wt %, preferably 0.2 to 5 wt % relative to the reactive resin.

The reactive resin may also contain a reactive diluent, if this is necessary. For this purpose, an excess of hydroxyfunctionalized (meth)acrylate optionally used during production of the backbone resin may function as the reactive diluent. In addition, if the hydroxyfunctionalized (meth)acrylate is used in approximately equimolar proportions with the isocyanate group, or additionally, if an excess of hydroxyfunctionalized (meth)acrylate is used, further reactive diluents, which are structurally different from the hydroxyfunctionalized (meth)acrylate, may be added to the reaction mixture.

Suitable reactive diluents are low-viscosity, free-radical-co-polymerizable compounds, preferably compounds exempt from labeling, which are added if necessary in order to adapt the viscosity among other properties of the urethane methacrylate or of the precursors during the production thereof.

Suitable reactive diluents are described in the Applications EP 1 935 860 A1 and DE 195 31 649 A1. Preferably, the reactive resin (the resin mixture) contains, as reactive diluent, a (meth)acrylic acid ester, wherein aliphatic or aromatic $C_5$-$C_{15}$ (meth)acrylates are selected particularly preferably. Suitable examples include: 2-hydroxypropyl (meth)acrylate, 3-hydroxypropyl (meth)acrylate, 1,2-ethanediol di-(meth)acrylate, 1,3-propanediol dimethacrylate, 1,3-butanediol di(meth)acrylate, 1,4-butanediol di(meth) acrylate, trimethylolpropane tri(meth)acrylate, phenylethyl (meth)acrylate, tetrahydrofurfuryl (meth)acrylate, ethyl triglycol (meth)acrylate, N,N-dimethylaminoethyl (meth)acrylate, N,N-dimethylaminomethyl (meth)acrylate, N,N-diethylaminoethyl (meth)acrylate, acetoacetoxyethyl (meth) acrylate, isobornyl (meth)acrylate, 2-ethylhexyl (meth) acrylate, tert-butylcyclohexyl (meth)acrylate, benzyl (meth) acrylate, methyl (meth)acrylate, n-butyl (meth)acrylate, isobutyl (meth)acrylate, 3-trimethoxysilylpropyl (meth) acrylate, isodecyl (meth)acrylate, diethylene glycol di(meth) acrylate, triethylene glycol di(meth)acrylate, methoxypolyethylene glycol mono(meth)acrylate, trimethylcyclohexyl (meth)acrylate, 2-hydroxyethyl (meth)acrylate, dicyclopentenyloxyethyl (meth)acrylate and/or tricyclopentadienyl di(meth)acrylate, bisphenol A (meth) acrylate, novolac epoxy di(meth)acrylate, di-[(meth) acryloyl-maleoyl]-tricyclo-5.2.1.0.2.6-decane, 3-(meth) acryloyl-oxymethyl-tricylo-5.2.1.0.2.6-decane, 3-(meth) cyclo-pentadienyl (meth)acrylate and decalyl-2-(meth) acrylate; PEG di(meth)acrylate, such as PEG200 di(meth) acrylate, tetraethylene glycol di(meth)acrylate, solketal (meth)acrylate, cyclohexyl (meth)acrylate, phenoxyethyl di(meth)acrylate, 2-phenoxyethyl (meth)acrylate, hexanediol-1,6-di(meth)acrylate, 1,2-butanediol di(meth)acrylate, methoxyethyl(meth)acrylate, butyldiglycol (meth)acrylate, tert-butyl (meth)acrylate and norbornyl (meth)acrylate. Methacrylates are preferred over acrylates.

2- and 3-Hydroxypropyl methacrylate, 1,2-ethanediol dimethacrylate, 1,4-butanediol dimethacrylate, 1,3-butanediol dimethacrylate, glycerol dimethacrylate, trimethylolpropane trimethacrylate, acetoacetoxyethyl methacrylate, isobornyl methacrylate, bisphenol A dimethacrylate, ethoxylated bisphenol A methacrylates such as E2BADMA or E3BADMA, trimethylcyclohexyl methacrylate, 2-hydroxyethyl methacrylate, PEG200 dimethacrylate and norbornyl methacrylate are particularly preferred and a mixture of 2- and 3-hydroxypropyl methacrylate and 1,4-butanediol dimethacrylate or a mixture of these three methacrylates is quite particularly preferred.

The most preferred is a mixture of 2- and 3-hydroxypropyl methacrylate. In principle, other common free-radicalpolymerizable compounds may also be used as reactive diluents, alone or in a mixture with the (meth)acrylic acid esters, e.g. methacrylic acid, styrene, α-methylstyrene, alkylated styrenes, such as tert-butylstyrene, divinylbenzene and vinyl as well as allyl compounds, wherein the representatives thereof that are exempt from labeling are preferred. Examples of such vinyl or allyl compounds are hydroxybutyl vinyl ether, ethylene glycol divinyl ether, 1,4-butanediol divinyl ether, trimethylolpropane divinyl ether, trimethylolpropane trivinyl ether, mono-, di-, tri-, tetra- and polyalkylene glycol vinyl ethers, mono-, di-, tri-, tetra- and polyalkylene glycol allyl ethers, adipic acid divinyl ester, trimethylolpropane diallyl ether and trimethylolpropane triallyl ether.

The reactive diluent or diluents is or are added in a proportion 65 to 10 wt %, preferably 60 to 20 wt %, more preferably 55 to 25 wt %, particularly preferably in proportions below 50 wt %, relative to the reactive resin.

An exemplary reactive resin comprises a compound of general formula (I)

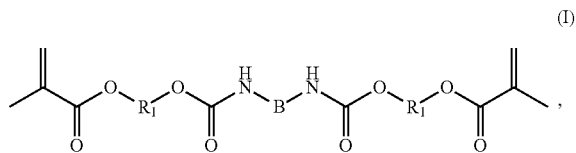

in which B is an aliphatic hydrocarbon group and each $R_1$ independently of one another is a branched or linear aliphatic $C_1$-$C_{15}$ alkyl group, as the backbone resin, a stable nitroxyl radical as the inhibitor, a substituted toluidine as the accelerator and optionally a reactive diluent.

A preferred reactive resin comprises (a) a compound of formula (IIa), (IIb) or (IIc)

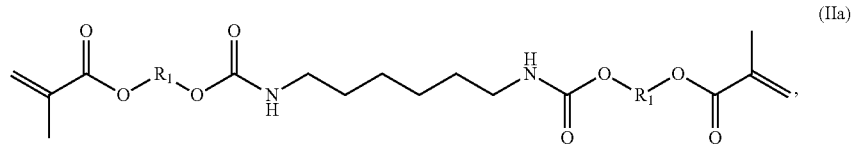

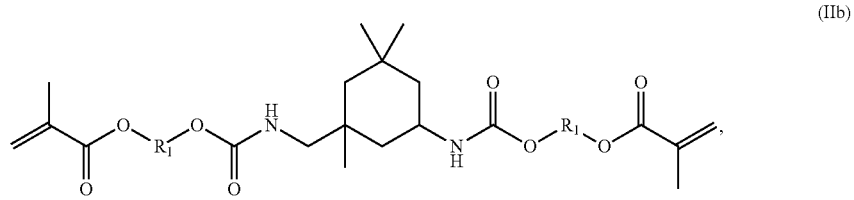

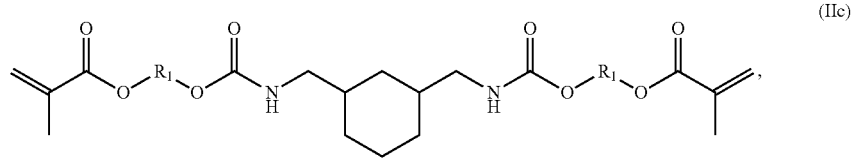

in which each $R_1$ independently of one another is a branched or linear aliphatic $C_1$-$C_{15}$ alkyl group, as the backbone resin, a stable nitroxyl radical as the inhibitor, a substituted toluidine as the accelerator and optionally a reactive diluent.

A further preferred reactive resin comprises a compound of formula (III), (IV) or (V)

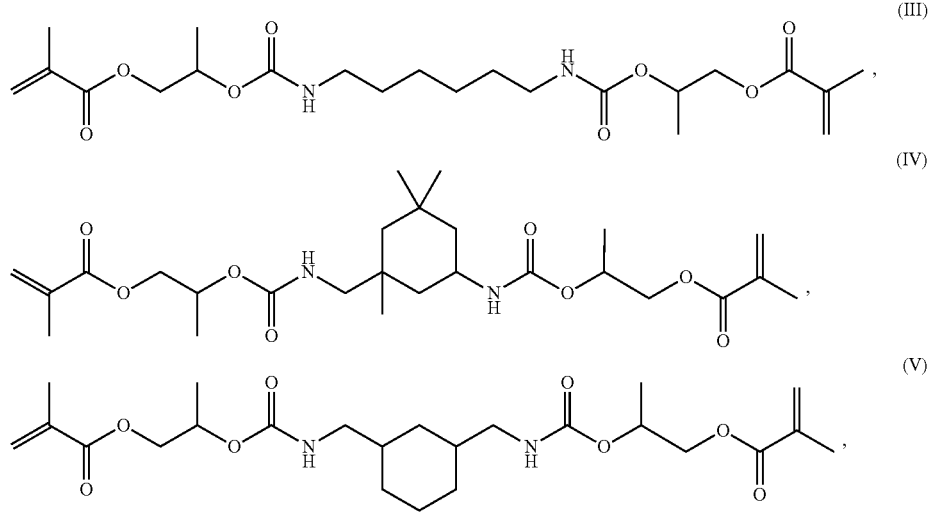

as the backbone resin, a stable nitroxyl radical as the inhibitor, a substituted toluidine as the accelerator and optionally a reactive diluent.

A particularly preferred reactive resin comprises a compound of formula (III), (IV) or (V) as the backbone resin, 4-hydroxy-2,2,6,6-tetramethyl-piperidinyl-1-oxyl (TEMPOL) as the inhibitor, di-iso-propanol-p-toluidine as the accelerator and a mixture of hydroxypropyl methacrylate and 1,4-butanediol dimethacrylate (BDDMA) as the reactive diluent.

By virtue of the low-viscosity backbone resin, an inventive reactive resin has particularly low dynamic viscosity, and so it is possible to produce, for a reactive-resin system, a reactive-resin component, which exhibits substantially lower extrusion forces at application temperatures below 10° C., preferably at 0° C., than do conventional systems, without the high proportions of reactive diluents needed heretofore for the purpose.

A further subject matter of the invention is a reactive-resin component that contains the reactive resin. The reactive-resin component may contain inorganic aggregates, such as fillers and/or additives, in addition to the inventive reactive resin. It should be pointed out that some substances, both as fillers and optionally in modified form, may also be used as additive. For example, fumed silica functions more as a filler in its polar, non-post-treated form and more as an additive in its apolar, post-treated form. In cases in which exactly the same substance can be used as filler or additive, the total quantity thereof should not exceed the upper limit stipulated herein for fillers.

For production of a reactive-resin component for construction purposes, especially chemical fastening, common fillers and/or additives may be added to the inventive reactive resin. These fillers are typically inorganic fillers and additives, such as described hereinafter by way of example.

The proportion of the reactive resin in the reactive-resin component preferably ranges from approximately 10 to approximately 70 wt %, more preferably from approximately 30 to approximately 50 wt %, relative to the reactive-resin component. Accordingly, the proportion of fillers preferably ranges from approximately 90 to approximately 30 wt %, more preferably from approximately 70 to approximately 50 wt %, relative to the reactive-resin component.

Common fillers, preferably mineral or mineral-like fillers, such as quartz, glass, sand, quartz sand, quartz flour, porcelain, corundum, ceramic, talc, silica (e.g. fumed silica, especially polar non-post-treated fumed silica), silicates, aluminum oxides (e.g. alumina), clay, titanium dioxide, chalk, heavy spar, feldspar, basalt, aluminum hydroxide, granite or sandstone, polymeric fillers such as thermosetting plastics, hydraulically curable fillers, such as gypsum, burnt lime or cement (e.g. aluminate cement (often also referred to as aluminous cement) or Portland cement), metals, such as aluminum, carbon black, further wood, mineral or organic fibers or the like, or mixtures of two or more thereof, are used as fillers. The fillers may exist in any desired forms, for example as powder or flour or as shaped bodies, e.g. in the form of cylinders, rings, balls, platelets, rods, shells or crystals, or further in fiber form (fibrillar fillers), and the corresponding basic particles preferably have a maximum diameter of approximately 10 mm and a minimum diameter of approximately 1 nm. This means that the diameter is approximately 10 mm or any value smaller than approximately 10 mm, but larger than approximately 1 nm. Preferably the maximum diameter is a diameter of approximately 5 mm, more preferably of approximately 3 mm, even more preferably of approximately 0.7 mm. A maximum diameter of approximately 0.5 mm is quite particularly preferred. The more preferred minimum diameter is approximately 10 nm, even more preferably approximately 50 nm, quite particularly preferably approximately 100 nm. Diameter ranges obtained by combination of this maximum diameter and minimum diameter are particularly preferred. However, the globular inert substances (spherical shape), which have a distinctly more reinforcing effect, are preferred. Core-shell particles, preferably with spherical shape, may also be used as fillers.

Preferred fillers are selected from the group consisting of cement, silica, quartz, quartz sand, quartz flour and mixtures of two or more thereof. Fillers selected from the group consisting of cement, fumed silica, especially untreated, polar fumed silica, quartz sand, quartz flour and mixtures of two or more thereof are particularly preferred for the reactive-resin component (A). A mixture of cement (especially aluminate cement (often also referred to as aluminous cement) or Portland cement), fumed silica and quartz sand is quite particularly preferred for the reactive-resin component (A). For the hardener component (B), fumed silica is preferred as the sole filler or as one of several fillers; particularly preferably, not only fumed silica but also one or more further fillers are present.

Common additives, i.e. thixotropic agents, such as, optionally, organically or inorganically post-treated fumed silica (except if it is already being used as filler), especially apolarly post-treated fumed silica, bentonites, alkyl and methyl celluloses, castor oil derivatives or the like, plasticizers, such as phthalic acid or sebacic acid ester, further stabilizers in addition to the stabilizers and inhibitors used according to the invention, antistatic agents, thickening agents, flexibilizers, rheology additives, wetting agents, coloring additives, such as dyes or especially pigments, for example for different coloration of the components to permit better control of intermixing thereof, or the like, or mixtures of two or more thereof, are used as additives. Non-reactive diluents (solvents) may also be included, preferably in a proportion of up to 30 wt % relative to the total quantity of the reactive-resin component, such as lower alkyl ketones, e.g. acetone, di-lower-alkyl lower alkanoylamides, such as dimethylacetamide, lower alkylbenzenes, such as xylenes or toluene, phthalic acid esters or paraffins, water or glycols.

Furthermore, metal scavengers in the form of surface-modified fumed silicas may be contained in the reactive-resin component. Preferably, at least one thixotropic agent is present as additive, particularly preferably an organically or inorganically post-treated fumed silica, quite particularly preferably an apolarly post-treated fumed silica.

In this respect, reference is made to the Applications WO 02/079341 and WO 02/079293 as well as WO 2011/128061 A1.

The proportion of additives in the reactive-resin component may range up to approximately 5 wt %, relative to the reactive-resin component.

The reactive resins produced according to the invention can be used in many areas, in which unsaturated polyester resins, vinyl ester resins or vinyl ester urethane resins are otherwise commonly used. They are commonly used as resin ingredient in the reactive-resin component of a reactive-resin system, such as a multi-component system, typically a two-component system comprising a reactive-resin component (A) and a hardener component (B). This multi-component system can exist in the form of a cartridge system, a canister system or a film-bag system. During use of the system as intended, the components are extruded from the cartridges, canisters or film bags either by application of mechanical forces or by gas pressure, mixed with one another, preferably using a static mixer, through which the ingredients are conveyed, and applied.

Subject matter of the present invention is therefore also a reactive-resin system having a reactive-resin component (A) and a hardener component (B) as just described, that contains an initiator for the urethane methacrylate compound.

The initiator is customarily a peroxide. All peroxides known to the person skilled in the art that are used for curing of unsaturated polyester resins and vinyl ester resins may be employed. Such peroxides comprise organic and inorganic peroxides that are either liquid or solid, wherein hydrogen peroxide may also be used. Examples of suitable peroxides are peroxycarbonates (of the formula —OC(O)O—), peroxy esters (of the formula —C(O)OO—), diacyl peroxides (of the formula —C(O)OOC(O)—), dialkyl peroxides (of the formula —OO—) and the like. These may be present as oligomers or polymers.

Preferably, the peroxides are selected from the group of organic peroxides. Suitable organic peroxides are: tertiary alkyl hydroperoxides, such as tert-butyl hydroperoxide, and other hydroperoxides, such as cumene hydroperoxide, peroxy esters or peracids, such as tert-butyl peresters, benzoyl peroxide, peracetates and perbenzoates, lauryl peroxide, including (di)peroxy esters, perethers, such as peroxy diethyl ether, perketones, such as methyl ethyl ketone peroxide. The organic peroxides used as hardeners are often tertiary peresters or tertiary hydroperoxides, i.e. peroxide compounds with tertiary carbon atoms, which are bound directly to an —O—O-acyl- or —OOH— group. However, mixtures of these peroxides with other peroxides may also be used according to the invention. The peroxides may also be mixed peroxides, i.e. peroxides that have two different peroxide-carrying units in one molecule. Preferably, (dibenzoyl) peroxide (BPO) is used for curing.

The reactive-resin system may be present in the form of a two-component or multi-component system, in which the respective components exist spatially separated from one another, so that a reaction (curing) of the components take place only after they have been mixed.

A two-component reactive-resin system preferably comprises the A component and the B component separated, to ensure inhibition of reaction, into different containers, for example of a multi-chamber apparatus, such as a multi-chamber cartridge and/or canister, from which containers the two components are extruded by application of mechanical pressing forces or by application of a gas pressure and then mixed. A further possibility consists in packaging the two-component reactive-resin system as two-component capsules, which are introduced into the drilled hole and destroyed by percussively turning the fastening element to set it while simultaneously intermixing the two components of the mortar caulk. Preferably, a cartridge system or an injection system is used herein, in which the two components are extruded from the separated containers and passed through a static mixer, in which they are mixed homogeneously and then discharged via a nozzle, preferably directly into the drilled hole.

In a preferred embodiment of the inventive reactive-resin system, the reactive-resin system is a two-component system, and the reactive-resin component (A) contains not only the backbone resin but additionally also a hydraulically binding or polycondensable inorganic compound, especially cement, and the hardener component (B) contains not only the initiator for polymerization of the backbone resin but also water. Such hybrid mortar systems are described in detail in DE 4231161 A1. Therein, component (A) preferably contains cement as the hydraulically binding or polycondensable inorganic compound, for example Portland cement or aluminous cement, wherein cements free of transition metal oxides or low in transition metals are particularly preferred. Gypsum as such or mixed with the cement may also be used as the hydraulically binding inorganic compound. Component (A) may also comprise, as the polycondensable inorganic compound, silicatic polycondensable compounds, especially substances containing soluble, dissolved and/or amorphous silicon dioxide, such as, for example, polar, non-post-treated fumed silica.

The volume ratio of component A to component B in a two-component system is preferably 3:1, 5:1 or 7:1. A volume ratio of 3:1 or 5:1 is particularly preferred.

In a preferred embodiment, the reactive-resin component (A) therefore contains the following:
- at least one urethane (meth)acrylate as defined hereinabove, preferably a compound of formula (IIa), (IIb) or (IIc);
- at least one inhibitor of piperidinyl-N-oxyl or tetrahydropyrrole-N-oxyl type as defined hereinabove, preferably TEMPOL;
- at least one accelerator defined as hereinabove, preferably a toluidine derivative, particularly preferably di-iso-propanol-p-toluidine;
- at least one hydraulically binding or polycondensable inorganic compound, preferably cement; and
- at least one thixotropic agent, preferably fumed silica, and the hardener component (B) contains:
- at least one initiator for initiation of polymerization of the urethane (meth)acrylate, preferably benzoyl peroxide (BPO) or tert-butyl peroxybenzoate; and
- water.

In a more preferred embodiment, the reactive-resin component (A) contains:
- at least one urethane (meth)acrylate as defined hereinabove, preferably a compound of formula (IIa), (IIb) or (IIc);
- at least one inhibitor of piperidinyl-N-oxyl or tetrahydropyrrole-N-oxyl type as defined hereinabove, preferably TEMPOL;
- at least one accelerator, preferably a toluidine derivative, particularly preferably di-iso-propanol-p-toluidine;
- at least one hydraulically binding or polycondensable inorganic compound, preferably cement; and
- at least one thixotropic agent, preferably fumed silica, and the hardener component (B) contains:
- at least one initiator for initiation of polymerization of the urethane (meth)acrylate, preferably benzoyl peroxide (BPO) or tert-butyl peroxybenzoate;
- at least one filler, preferably quartz sand or quartz flour; and
- water.

In an even more preferred embodiment, the reactive-resin component (A) contains:
- at least one urethane (meth)acrylate as defined hereinabove, preferably a compound of formula (IIa), (IIb) or (IIc);
- at least one inhibitor of piperidinyl-N-oxyl or tetrahydropyrrole-N-oxyl type as defined hereinabove, preferably TEMPOL;
- at least one accelerator, preferably a toluidine derivative, particularly preferably di-iso-propanol-p-toluidine;
- at least one further inhibitor, which is selected from the group consisting of catechols and phenothiazines;
- at least one hydraulically binding or polycondensable inorganic compound, preferably cement; and
- at least one thixotropic agent, preferably fumed silica, and the hardener component (B) contains:
- at least one initiator for initiation of polymerization of the urethane (meth)acrylate, preferably benzoyl peroxide (BPO) or tert-butyl peroxybenzoate;
- at least one filler, preferably quartz sand or quartz flour;
- at least one thixotropic agent, preferably fumed silica; and
- water.

In an even more preferred embodiment, the reactive-resin component (A) contains:
- at least one urethane (meth)acrylate as defined hereinabove, preferably a compound of formula (IIa), (IIb) or (IIc);
- at least one inhibitor of piperidinyl-N-oxyl or tetrahydropyrrole-N-oxyl type as defined hereinabove, preferably TEMPOL;
- at least one accelerator, preferably a toluidine derivative, particularly preferably di-iso-propanol-p-toluidine;
- at least one further inhibitor, which is selected from the group consisting of catechols and phenothiazines;
- at least one hydraulically binding or polycondensable inorganic compound, preferably cement;
- at least one thixotropic agent, preferably fumed silica; and
- at least one further filler, preferably quartz sand, and the hardener component (B) contains:
- benzoyl peroxide (BPO) or tert-butyl peroxybenzoate as the initiator for initiation of polymerization of the urethane (meth)acrylate;
- at least one filler, preferably quartz sand or quartz flour;
- at least one thixotropic agent, preferably fumed silica; and
- water.

In an even more preferred embodiment, the reactive-resin component (A) contains:
- at least one urethane (meth)acrylate as defined hereinabove, preferably a compound of formula (III), (IV) or (V);
- TEMPOL;
- di-iso-propanol-p-toluidine;
- at least one further inhibitor, which is selected from the group consisting of catechols and phenothiazines;
- cement;
- fumed silica; and
- quartz sand, and the hardener component (B) contains:
- at least one initiator for initiation of polymerization of the urethane (meth)acrylate;
- fumed silica;
- quartz sand or quartz flour and
- water.

In each of these embodiments, the reactive-resin component (A) additionally also contains, in a preferred embodiment, at least one reactive diluent. Preferably, this reactive diluent is a monomer or a mixture of several monomers of the backbone resin.

In each of these embodiments, the reactive-resin components (A) and the hardener components (B) can be combined with one another in any desired manner.

Such a reactive-resin system is used above all in the building sector (construction purposes), for example for creation and maintenance or repair of building parts and building structures, for example of concrete, as a polymer concrete, as a plastic-based coating caulk or as a cold-curing road marking, for reinforcement of building parts and building structures, for example walls, ceilings or floors, the fastening of building parts, such as panels or blocks, for example of stone, glass or plastic, on building parts or building structures, for example by adhesive bonding (constructional adhesive bonding). It is particularly suitable for chemical fastening. It is quite particularly suitable for chemical fastening (by substance-to-substance and/or interlocking joining) of anchoring means, such as anchor rods, bolts, rebars, screws or the like in recesses, such as drilled holes, especially in holes drilled in various substrates, especially mineral substrates, such as those on the basis of concrete, cellular concrete, brickwork, lime sandstone, sandstone, natural rock, glass and the like, and metallic substrates, such as those of steel. In one embodiment, the substrate of the drilled hole is concrete and the anchoring means consists of steel or iron. In a further embodiment, the substrate of the drilled hole is steel and the anchoring means consists of steel or iron. For this purpose, the components are injected into the drilled hole, after which the devices to be fastened, such as threaded anchor rods and the like, are introduced into the drilled hole charged with the curing reactive resin and are appropriately adjusted.

The invention will be further explained on the basis of the following examples.

EXAMPLES

Reactive-resin master batches, reactive resins, reactive-resin components and two-component reactive-resin systems were produced as backbone resin using compounds (III) and (IV). The dynamic viscosity of the reactive resins and of the reactive-resin components were determined, as were the forces for extruding the two-component reactive-resin systems.

A1. Production of Reactive-Resin Master Batch A1 with Compound (III)

1444 g Hydroxypropyl methacrylate was first introduced into a 2-liter glass laboratory reactor with internal thermometer and stirrer shaft then 0.23 g phenothiazine (D Prills; Allessa Chemie), 0.56 g 4-hydroxy-2,2,6,6-tetramethyl-piperidinyl-1-oxyl (TEMPOL; Evonik Degussa GmbH) and 0.38 g dioctyltin dilaurate (TIB KAT® 216; TIB Chemicals) were added. The batch was heated to 80° C. Then 455 g hexamethylene-1,6-diisocyanate (Sigma Aldrich) was added dropwise with stirring (200 rpm) within 45 minutes. Thereafter stirring was continued for a further 60 minutes at 80° C.

Hereby the inventive reactive-resin master batch A1 containing 65 wt % of compound (III) as backbone resin and 35 wt % hydroxypropyl methacrylate, relative to the total weight of the reactive-resin master batch, was obtained.

Compound (III) has the following structure:

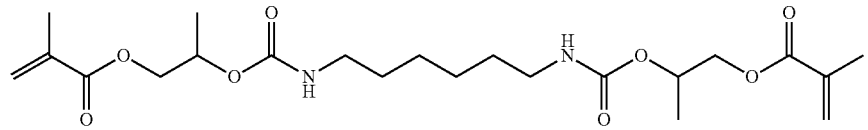 [SMILES: C=C(C)C(=O)OCC(C)OC(=O)NCCCCCCNC(=O)OC(C)COC(=O)C(=C)C]

A2. Production of Reactive Resin A2

6.4 g 4-Hydroxy-2,2,6,6-tetramethyl-piperidinyl-1-oxyl (TEMPOL; Evonik Degussa GmbH) and 24.5 g di-isopropanol-p-toluidine (BASF SE) were added to a mixture of 702 g reactive-resin master batch A1, 210 g hydroxypropyl methacrylate and 456 g 1,4-butanediol dimethacrylate (BDDMA; Evonik AG).

Hereby the inventive reactive resin A2 was obtained.

A3. Production of Reactive-Resin Component A3

354 g Reactive resin A2 was mixed with 185 g Secar® 80 (Kerneos Inc.), 27 g CAB-O-SIL® TS-720 (Cabot Corporation) and 335 g quartz sand F32 (Quarzwerke GmbH) in the dissolver under vacuum, using a PC Labor System Dissolver of LDV 0.3-1 type. The mixture was stirred for 8 minutes at 3500 rpm under vacuum (pressure≤100 mbar) with a 55 mm dissolver disk and an edge scraper.

Hereby the inventive reactive-resin component A3 was obtained.

B1. Production of Reactive-Resin Master Batch B1 with Compound (IV)

1433 g Hydroxypropyl methacrylate was first introduced into a 2-liter glass laboratory reactor with internal thermometer and stirrer shaft then 0.21 g phenothiazine (D Prills; Allessa Chemie), 0.53 g 4-hydroxy-2,2,6,6-tetramethyl-piperidinyl-1-oxyl (TEMPOL; Evonik Degussa GmbH) and 0.36 g dioctyltin dilaurate (TIB KAT® 216; TIB Chemicals) were added. The batch was heated to 80° C. Then 566 g isophorone diisocyanate (Sigma Aldrich) was added dropwise with stirring (200 rpm) within 45 minutes. Thereafter stirring was continued for a further 120 minutes at 80° C.

Hereby reactive-resin master batch B1 containing 65 wt % of compound (IV) as backbone resin and 35 wt % hydroxypropyl methacrylate, relative to the total weight of the reactive-resin master batch, was obtained.

Compound (IV) has the following structure:

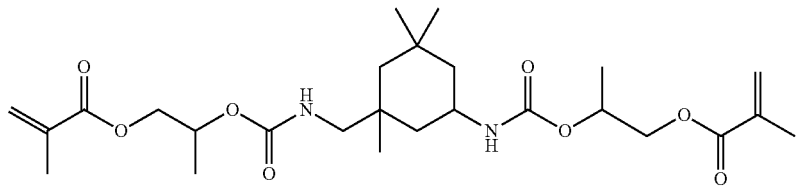 [SMILES: C=C(C)C(=O)OCC(C)OC(=O)NCC1(C)CC(NC(=O)OC(C)COC(=O)C(=C)C)CC(C)(C)C1]

B2. Production of Reactive Resin B2

3.3 g 4-Hydroxy-2,2,6,6-tetramethyl-piperidinyl-1-oxyl (TEMPOL; Evonik Degussa GmbH) and 14.0 g di-isopropanol-p-toluidine (BASF SE) were added to a mixture of 401 g reactive-resin master batch from B1, 120 g hydroxypropyl methacrylate and 261 g 1,4-butanediol dimethacrylate (BDDMA; Evonik AG).

Hereby reactive resin B2 was obtained.

B3. Production of Reactive-Resin Component B3

354 g Reactive resin B2 was mixed with 185 g Secar® 80 (Kerneos Inc.), 27 g CAB-O-SIL® TS-720 (Cabot Corporation) and 335 g quartz sand F32 (Quarzwerke GmbH) in the dissolver under vacuum, using a PC Labor System Dissolver of LDV 0.3-1 type, as indicated under A3.

Hereby reactive-resin component B3 was obtained.

C1. Production of Reactive-Resin Master Batch C1 with Compound (V)

1476 g Hydroxypropyl methacrylate was first introduced into a 2-liter glass laboratory reactor with internal thermometer and stirrer shaft then 0.23 g phenothiazine (D Prills; Allessa Chemie), 0.56 g 4-hydroxy-2,2,6,6-tetramethyl-piperidinyl-1-oxyl (TEMPOL; Evonik Degussa GmbH) and 0.38 g dioctyltin dilaurate (TIB KAT® 216; TIB Chemicals) were added. The batch was heated to 80° C. Then 523 g 1,3-bis(isocyanatomethyl)cyclohexane (TCI Europe) was added dropwise with stirring (200 rpm) within 45 minutes. Thereafter stirring was continued for a further 120 minutes at 80° C.

Hereby reactive-resin master batch C1 containing 65 wt % of compound (V) as backbone resin and 35 wt % hydroxypropyl methacrylate, relative to the total weight of the reactive-resin master batch, was obtained.

Compound (V) has the following structure:

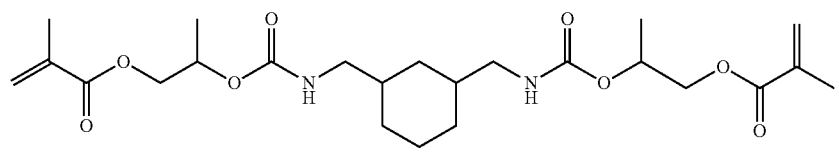 [SMILES: C=C(C)C(=O)OCC(C)OC(=O)NCC1CCCC(CNC(=O)OC(C)COC(=O)C(=C)C)C1]

C2. Production of Reactive Resin C2

3.3 g 4-Hydroxy-2,2,6,6-tetramethyl-piperidinyl-1-oxyl (TEMPOL; Evonik Degussa GmbH) and 14.0 g di-isopropanol-p-toluidine (BASF SE) were added to a mixture of 401 g reactive-resin master batch from C1, 120 g hydroxypropyl methacrylate and 261 g 1,4-butanediol dimethacrylate (BDDMA; Evonik AG).

Hereby reactive resin C2 was obtained.

C3. Production of Reactive-Resin Component C3

354 g Reactive resin C2 was mixed with 185 g Secar® 80 (Kerneos Inc.), 27 g CAB-O-SIL® TS-720 (Cabot Corporation) and 335 g quartz sand F32 (Quarzwerke GmbH) in the dissolver under vacuum, using a PC Labor System Dissolver of LDV 0.3-1 type, as indicated under A3.

Hereby reactive-resin component C3 was obtained.

D1. Production of Comparison Reactive-Resin Master Batch D1 with Comparison Compound 1

Comparison reactive-resin master batch D1 containing comparison compound 1 as backbone resin was synthesized according to the method in EP 0 713 015 A1, which is included herewith as reference and to the entire disclosure of which reference is made.

Reactive-resin master batch D1 contains 65 wt % comparison compound 1 as backbone resin and 35 wt % hydroxypropyl methacrylate, relative to the total weight of the comparison reactive-resin master batch.

The product (comparison compound 1) has an oligomer distribution, wherein the oligomer containing a repeat unit has the following structure:

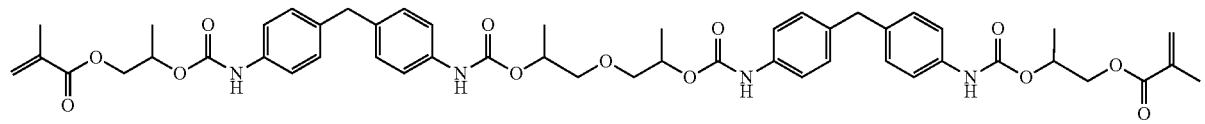

D2. Production of Comparison Reactive Resin D2

9.2 g 4-Hydroxy-2,2,6,6-tetramethyl-piperidinyl-1-oxyl (TEMPOL; Evonik Degussa GmbH) and 35.0 g di-isopropanol-p-toluidine (BASF SE) were added to a mixture of 1004 g comparison reactive-resin master batch D1, 300 g hydroxypropyl methacrylate and 652 g 1,4-butanediol dimethacrylate (BDDMA; Evonik AG).

Hereby comparison reactive resin D2 was obtained.

D3. Production of Comparison Reactive-Resin Component D3

354 g Comparison reactive resin D2 was mixed with 185 g Secar® 80 (Kerneos Inc.), 27 g CAB-O-SIL® TS-720 (Cabot Corporation) and 335 g quartz sand F32 (Quarzwerke GmbH) in the dissolver under vacuum, using a PC Labor System Dissolver of LDV 0.3-1 type, as indicated under A3.

Hereby comparison reactive-resin component D3 was obtained.

E1. Production of Comparison Reactive-Resin Master Batch E1 with Comparison Compound 2

Comparison reactive-resin master batch E1 containing comparison compound 2 as backbone resin was synthesized according to the method in EP 0 713 015 A1, which is included herewith as reference and to the entire disclosure of which reference is made.

Comparison reactive-resin master batch E1 contains 65 wt % comparison compound 2 as backbone resin and 35 wt % hydroxypropyl methacrylate, relative to the total weight of the comparison reactive-resin master batch.

Comparison compound 2 has the following structure:

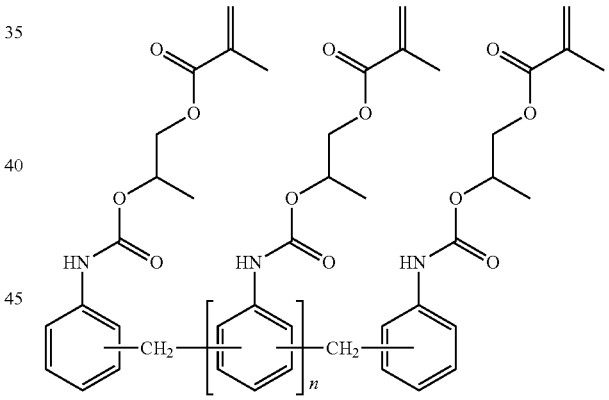

E2. Production of Comparison Reactive Resin E2

4.6 g 4-Hydroxy-2,2,6,6-tetramethyl-piperidinyl-1-oxyl (TEMPOL; Evonik Degussa GmbH) and 17.5 g di-isopropanol-p-toluidine (BASF SE) were added to a mixture of 502 g master batch from D1, 150 g hydroxypropyl methacrylate and 326 g 1,4-butanediol dimethacrylate (BDDMA; Evonik AG).

Hereby comparison reactive-resin E2 was obtained.

E3. Production of Comparison Reactive-Resin Component E3

354 g Comparison reactive resin E2 was mixed with 185 g Secar 80 (Kerneos Inc.), 27 g CAB-O-SIL® TS-720 (Cabot Corporation) and 335 g quartz sand F32 (Quarzwerke GmbH) in the dissolver under vacuum, using a PC Labor System Dissolver of LDV 0.3-1 type, as indicated under A3.

Hereby comparison reactive-resin component E3 was obtained.

In order to demonstrate the influence of compounds (III), (IV) and (V) on the viscosity of a reactive-resin master batch, of a reactive resin and of a reactive-resin component containing these compounds, the viscosities of the inventive reactive-resin master batches A1, B1 and C1, of reactive resins A2, B2 and C2 and of reactive-resin components A3, B3 and C3, as well as the forces for extruding two-component reactive-resin systems containing reactive-resin components A3, B3 and C3 were measured and respectively compared with the comparison formulations.

Measurement of the Dynamic Viscosity of the Reactive-Resin Master Batches

The dynamic viscosity of reactive-resin master batches A1, B1 and C1 and of comparison reactive-resin master batches D1 and E1 was measured with a cone-and-plate measuring system according to DIN 53019. The diameter of the cone was 20 mm and the opening angle was 1°. The measurement was performed at a constant shear velocity of 100/s and the respective temperature (0, 5, 10, 15, 20, 30 and 40° C.). The measurement duration was 120 s and one measured point was generated every second. The shear velocity was attained at the respective temperature by a preceding ramp from 0 to 100/s over a duration of 30 s. Since Newtonian fluids are involved, a linear evaluation over the measurement portion was undertaken and the viscosity was determined with constant shear velocity of 100/s over the measurement portion. Respectively three measurements were made, wherein the values indicated in Table 1 are the mean values of the three measurements.

Measurement of the Dynamic Viscosity of the Reactive-Resin Components

The dynamic viscosity of reactive-resin components A3, B3 and C3 and of comparison reactive-resin components D3 and E3 was measured using a plate/plate measuring system according to DIN 53019. The diameter of the plate was 20 mm and the gap distance was 3 mm. In order to prevent escape of the sample from the gap, a limiting ring of Teflon having a distance of 1 mm from the upper plate was used. The measurement temperature was 25° C. The method consisted of three portions: 1st Low shear, 2nd High shear, 3rd Low shear. During the 1st portion, shear was applied for 3 minutes at 0.5/s. In the 2nd portion, the shear velocity was increased logarithmically from 0.8/s to 100/s in 8 stages of 15 seconds each. These individual stages were: 0.8/s; 1.724/s; 3.713/s; 8/s; 17.24/s; 37.13/s; 80/s; 100/s. The 3rd portion was a repetition of the 1st portion. The viscosities were read at the end of each portion. The values indicated in Table 2 correspond to the value of the second portion at 100/s. Respectively three measurements were made, wherein the values indicated in Table 2 are the mean values of the three measurements.

Measurement of the Forces for Extruding the Two-Component Reactive-Resin Systems For measurement of the extrusion forces at 0° C. and 25° C., the reactive-resin components (component (A)) and the hardener component (component (B)), produced as in the foregoing, of the commercially available product HIT-HY 110 (Hilti Aktiengesellschaft; batch number. 1610264) were filled into plastic canisters (Ritter GmbH; volume ratio A:B=3:1) with inside diameters of approximately 47 mm (component (A)) and respectively approximately 28 mm (component (B)) and adjusted to temperatures of 0° C. and 25° C. respectively. Using a material-testing machine of the Zwick Co. with a load cell (test range up to 10 kN), the canisters were extruded via a static mixer (HIT-RE-M mixer; Hilti Aktiengesellschaft) with a constant speed of 100 mm/min over a path of 45 mm and in the process the mean force developed was measured.

The results of the measurements of the dynamic viscosity of reactive-resin master batches A1, B1 and C1 and of comparison reactive-resin master batches D1 and E1 are shown in Table 1.

They show that the inventive use of compounds (III), (IV) and (V) as backbone resin leads to lowering of the dynamic viscosity of the master batches containing these compounds. Especially at temperatures below 20° C., the dynamic viscosity of reactive-resin master batches A1, B1 and C1 is much lower than the dynamic viscosity of comparison reactive-resin master batches D1 and E1.

TABLE 1

Results of the measurement of the dynamic viscosity of reactive-resin master batches A1, B1 and C1 and of comparison reactive-resin master batches D1 and E1 at 0° C., 5° C., 10° C., 15° C., 20° C., 30° C. and 40° C.

|  | Reactive-resin master batch A1 | Reactive-resin master batch B1 | Reactive-resin master batch C1 | Comparison reactive-resin master batch D1 | Comparison reactive-resin master batch E1 |
|---|---|---|---|---|---|
| Dynamic viscosity [mPa · s] at 0° C. | 1,611 | 18,630 | 10,680 | 188,000 | 281,200 |
| Dynamic viscosity [mPa · s] at 5° C. | 923 | 8,998 | 4,922 | 81,520 | 110,500 |
| Dynamic viscosity [mPa · s] at 10° C. | 550 | 4,559 | 2,426 | 37,050 | 45,020 |

TABLE 1-continued

Results of the measurement of the dynamic viscosity of reactive-resin master batches A1, B1 and C1 and of comparison reactive-resin master batches D1 and E1 at 0° C., 5° C., 10° C., 15° C., 20° C., 30° C. and 40° C.

|  | Reactive-resin master batch A1 | Reactive-resin master batch B1 | Reactive-resin master batch C1 | Comparison reactive-resin master batch D1 | Comparison reactive-resin master batch E1 |
| --- | --- | --- | --- | --- | --- |
| Dynamic viscosity [mPa · s] at 15° C. | 339 | 2,364 | 1,266 | 17,280 | 19,470 |
| Dynamic viscosity [mPa · s] at 20° C. | 226 | 1,341 | 694 | 8,900 | 9,573 |
| Dynamic viscosity [mPa · s] at 30° C. | 117 | 514 | 251 | 2,795 | 2,769 |
| Dynamic viscosity [mPa · s] at 40° C. | 69 | 229 | 109 | 1,063 | 955 |

The dynamic viscosity of reactive-resin components A3, B3 and C3 was compared with the dynamic viscosity of comparison reactive-resin components D3 and E3. The results are summarized in Table 2.

They show that the inventive use of compounds (III), (IV) and (V) as backbone resin also leads to lowering of the dynamic viscosity at room temperature (23° C.) of the reactive-resin compounds produced therewith.

TABLE 2

Results of the measurement of the dynamic viscosity of reactive-resin components A3, B3 and C3 and of comparison reactive-resin components D3 and E3

|  | Reactive-resin component A1 | Reactive-resin component B1 | Reactive-resin component C1 | Comparison reactive-component D1 | Comparison reactive-component E1 |
| --- | --- | --- | --- | --- | --- |
| Dynamic viscosity [Pa · s] | 11.3 | 10.4 | 11.9 | 13.9 | 12.8 |

The forces for extruding two-component reactive-resin systems containing the reactive-resin components A3, B3 and C3 were compared with the forces for extruding the two-component reactive-resin system containing comparison reactive-resin components D3 and E3. The measured values are summarized in Table 3.

TABLE 3

Results of the measurement of the forces for extruding two-component reactive-resin systems containing reactive-resin components A3, B3 and C3 and the comparison two-component reactive-resin systems containing comparison reactive-resin components D3 and E3

|  | Reactive-resin system with reactive-resin component from A3 | Reactive-resin system with reactive-resin component from B3 | Reactive-resin system with reactive-resin component from C3 | Reactive-resin system with comparison reactive-resin component from D3 | Reactive-resin system with comparison reactive-resin component from E3 |
| --- | --- | --- | --- | --- | --- |
| Force [N] 0° C. | 1190 | 1456 | 1350 | 1631 | 1639 |
| Force [N] 25° C. | 983 | 932 | 899 | 1151 | 1079 |

The results in Table 3 show that two-component reactive-resin systems containing compounds (III), (IV) and (V) as backbone resins exhibit much lower extrusion forces at 25° C. and also at 0° C. than do the comparison two-component reactive-resin systems containing comparison compounds 1 and 2 as backbone resin.

20. The method according to claim 1, wherein the compound of formula comprises at least one compound selected from the group consisting of:
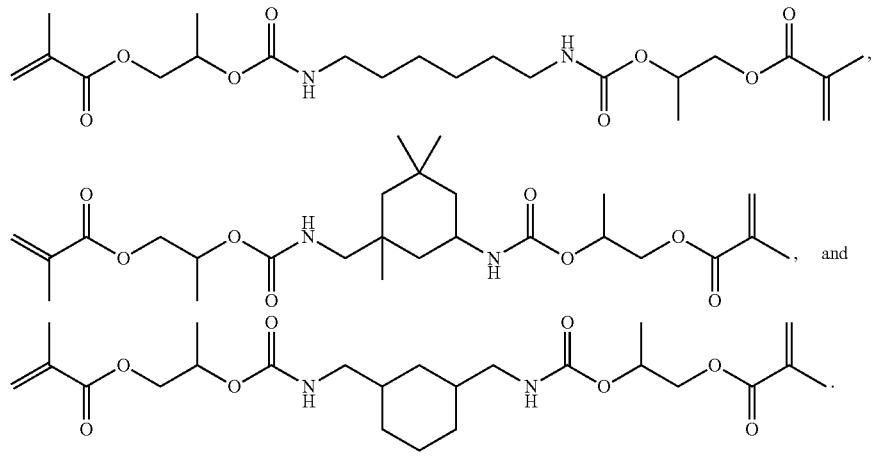

The invention claimed is:

1. A method for producing a reactive-resin or a reactive resin component, the method comprising:
incorporating a compound of formula (I) in the reactive-resin or the reactive resin component

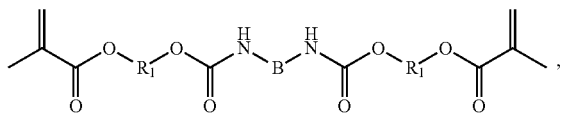
(I)

in which
B is a divalent linear, branched, or cyclic aliphatic hydrocarbon group, and
each $R_1$, independently of one another, is a divalent branched or linear aliphatic $C_1$-$C_{15}$ alkylene group,
wherein urethane (meth)acrylate(s) in the reactive-resin or the reactive resin component consist of one or more of the compounds of general formula (I).

2. A method for lowering viscosity of a reactive resin or extrusion force of a reactive-resin component for chemical fastening, the method comprising:
incorporating a compound of general formula (I) with the reactive-resin or the reactive resin component,
wherein general formula (I) is:

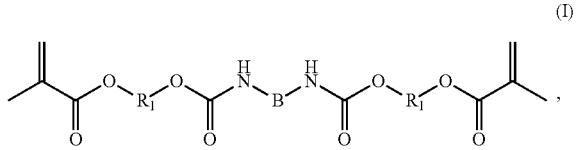
(I)

in which
B is a divalent linear, branched, or cyclic aliphatic hydrocarbon group, and
each $R_1$, independently of one another, is a divalent branched or linear aliphatic $C_1$-$C_{15}$ alkylene group,
wherein urethane (meth)acrylate(s) in the reactive-resin or the reactive resin component consist of one or more of the compounds of general formula (I).

3. The method according to claim 1, wherein B is the divalent linear aliphatic hydrocarbon group and is selected from the group consisting of pentylene groups, hexylene groups, heptylene groups, and octylene groups.

4. The method according to claim 1, wherein B is the divalent cyclic aliphatic hydrocarbon group and is selected from the group consisting of 3-methylene-3,5,5-trimethylcyclohexylene, methylenedicyclohexylene and 1,3-dimethylenecyclohexyl groups.

5. The method according to claim 1, wherein the divalent alkylene $R_1$ is a $C_1$-$C_6$ alkylene group.

6. The method according to claim 5, wherein the divalent alkylene group $R_1$ is an ethylene group or propylene group.

7. A reactive resin, comprising:
a compound of general formula (I)

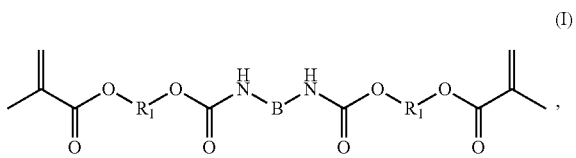
(I)

in which
B is a divalent linear, branched, or cyclic aliphatic hydrocarbon group, and
each $R_1$, independently of one another, is a divalent branched or linear aliphatic $C_1$-$C_{15}$ alkylene group,
an inhibitor,
an accelerator, and
optionally a reactive diluent,
wherein urethane (meth)acrylate(s) in the reactive resin consist of one or more of the compounds of general formula (I).

8. The reactive resin according to claim 7, wherein B is the divalent linear aliphatic hydrocarbon group and is selected from the group consisting of pentylene groups, hexylene groups, heptylene groups, and octylene groups.

9. The reactive resin according to claim 7, wherein B is the divalent cyclic aliphatic hydrocarbon group and is selected from the group consisting of 3-methylene-3,5,5-trimethylcyclohexylene, methylenedicyclohexylene and 1,3-dimethylenecyclohexyl groups.

10. The reactive resin according to claim 7, wherein the divalent alkylene group $R_1$ is a $C_1$-$C_6$ alkylene group.

11. The reactive resin according to claim 10, wherein the divalent alkylene group $R_1$ is an ethylene group or propylene group.

12. A reactive-resin component for a reactive-resin system, containing:
a reactive resin according to claim 7.

13. A reactive-resin system, having:
a reactive-resin component (A) according to claim 12 and
a hardener component (B), which contains an initiator.

14. The reactive-resin system according to claim 13, wherein at least one of the components (A) or (B) contains an inorganic aggregate.

15. A method of preparing the reactive-resin system according to claim 13 for construction purposes, the method comprising:
combining the reactive-resin component (A) and the hardener component (B).

16. A method of chemical fastening of an anchor in a drilled hole, the method comprising:
chemically fastening the anchor in the drilled hole with the reactive-resin system of claim 13.

17. The reactive resin according to claim 7, having a dynamic viscosity at 0° C. of from 1,611 to 10,680 mPa·s.

18. The reactive resin according to claim 7, having a dynamic viscosity at 20° C. of from 226 to 1,341 mPa·s.

19. The reactive resin according to claim 7, having a dynamic viscosity at 40° C. of from 69 to 109 mPa·s.